(12) United States Patent
Johnston et al.

(10) Patent No.: US 6,404,444 B1
(45) Date of Patent: Jun. 11, 2002

(54) METHOD AND APPARATUS FOR DISPLAYING AND CONTROLLING ALLOCATION OF RESOURCE IN A DATA PROCESSING SYSTEM

(75) Inventors: Keith Barker Johnston, Austin; Stephen Leroy Kinnison, Leander; James Lee Lentz, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/310,911

(22) Filed: May 13, 1999

(51) Int. Cl.[7] .................................................. G06F 3/00
(52) U.S. Cl. ..................... 345/839; 345/440; 345/440.2; 345/966
(58) Field of Search .................................. 345/764, 853, 345/835, 836, 839, 966, 846, 771, 772, 440, 440.2, 769

(56) References Cited

U.S. PATENT DOCUMENTS

| | | | | |
|---|---|---|---|---|
| 5,528,735 A | * | 6/1996 | Strasnick et al. ............ | 345/427 |
| 5,550,970 A | * | 8/1996 | Cline et al. .................. | 345/772 |
| RE35,881 E | * | 8/1998 | Barrett et al. .................. | 707/1 |
| 5,835,094 A | * | 11/1998 | Ermel et al. ................. | 345/848 |

* cited by examiner

Primary Examiner—Raymond J. Bayerl
Assistant Examiner—Kieu D. Vu
(74) Attorney, Agent, or Firm—Duke W. Yee; Volel Emile; Stephen J. Walder, Jr.

(57) ABSTRACT

A method and apparatus in a data processing system for displaying resource allocation information. Allocations of a resource are identified. A plurality of cylinders is displayed, wherein each cylinder within the plurality of cylinders provides a graphical representation of an allocation of the resource relative to other cylinders within the plurality of cylinders.

45 Claims, 14 Drawing Sheets

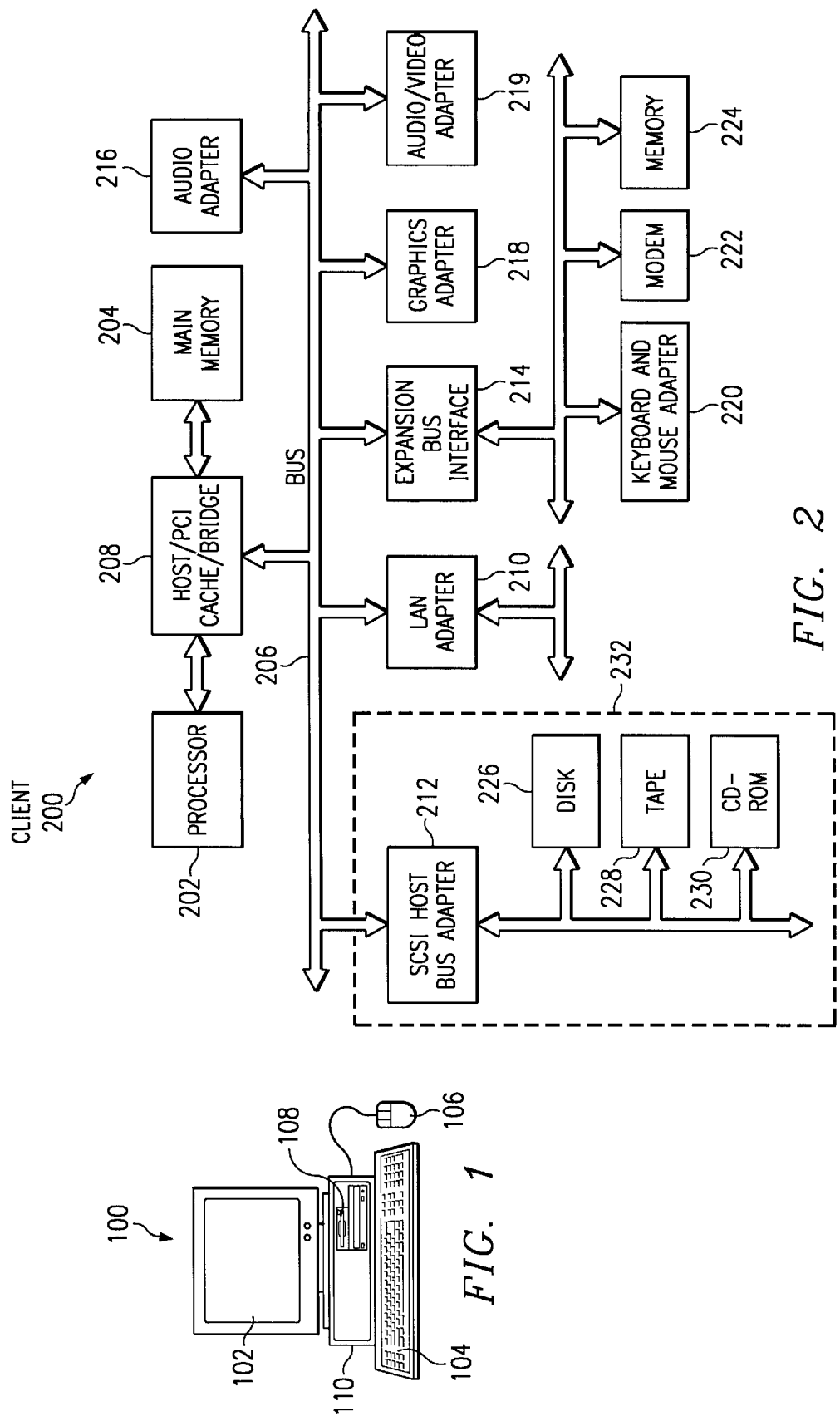

Get ResourceTotal  (Total Amount of resource – available + allocated)
Get nPartitions  (Number of partitions)
Set PartitionSpacing  (Vertical space between cylinders that represent partitions)
Set CylinderWidth  (Width of ellipse that represents cylinder diameter)
Set CylinderLength  (Length of ellipse that represents cylinder diameter)
Set TotalCylinderHt  (Total space available for partition cylinders + spaces between)

Partition[nPartitions]  Array of partition records

Partition[i].Size  Size of Partition[i]

Partition[i].Consumed  Size of consumed space in Partition[i]

ResourceAllocated = 0

FROM FIG. 10A

```
If nPartitions = 0 then
    DrawEmptyCylinder(TotalCylinderHt)
    Goto Exit
Else
    i=1
    While i <= nPartitions
        GetSize(Partition[i])
        GetAmountConsumed(Partition[i])
        ResourceAllocated = ResourceAllocated+Partition[i].Size
        ResourceUnallocated = ResourceTotal-ResourceAllocated
        %ResourceAllocated = ResourceAllocated/ResourceTotal
        %ResourceUnallocated = ResourceUnallocated/ResourceTotal (Calculate pixels available for vertical dimensions of cylinder segments)
    SumCylinderHts = TotalCylinderHt -(nPartitions*PartitionSpacing)

Y = 0
    i=1
    While i<=nPartitions
        Create Cylinder[i] As New Cylinder                                              (Create cylinder object)
        Set Cylinder[i](Y, (Partition[i].Size/ResourceTotal)*SumCylinderHts, CylinderWidth, CylinderLength)  (assign position & dimensions)
        Set Cylinder[i].PieSegment(Partition[i].Consumed/Partition[i].Size)             (Assign pie segment subobject property)
        DrawCylinder Cylinder[i]                                                        (Draw the resource cylinder)
        Y = Y + Partition[i].Size/ResourceTotal*SumCylinderHts+PartitionSpacing         (Move draw position up for next cylinder)

Create FreeSpace as New EmptyCylinder                                               (Create empty cylinder object)
    Draw FreeSpace(Y, %ResourceUnallocated*SumCylinderHts, CylinderWidth, CylinderLength)  (Draw unallocated cylinder)
End If
Exit
```

```
Cylinder.TopFace_GotFocus()
    Set HighlightOn TopFace          }—— 1100
End Cylinder.TopFace_LostFocus()
    Set HighlightOff TopFace
End Cylinder.TopFace_MouseDown(YPos)
(Adjust current cylinder size, current cylinder relative pie segment, other resource cylinder positions,
and free space cylinder to Y-position of mouse)
    OldYPos = YPos of TopFace
    If
        Make the pie segment line dashed
        Calculate tentative partition size based on relative increase or decrease in size based on YPos-OldYPos
        calculate tentative FreeSpace size based on change in partition size
        While FreeSpace < 0 and tentative partition size >= consumed
            For all cylinders whose index is greater than this cylinder,
                Move then up or down by the amount YPos-OldYPos
                Calculate tentative pie segment size based on tentative partition size
                redraw this cylinder
            draw tentative pie segment based on the tentative partition size
            redraw FreeSpace Cylinder
End Cylinder.TopFace_MouseUp()
    (tentative changes become fixed)
    Make the pie segment line solid
    partition size = tentative partition size
    update system with partition size
End
```

FIG. 11

```
Cylinder.PieSegment_GotFocus()
    Set HighlightOn PieSegment
End

Cylinder.PieSegment_LostFocus()
    Set HighlightOff PieSegment
End

Cylinder.PieSegment_MouseDown(XPos)
(Adjust current cylinder pie segment, current cylinder height other resource cylinder positions, and free space cylinder to mouse X-position)
    OldXPos = XPos of PieSegment
    Make the pie segment line dashed
    If Partition.Consumed/Partition.Size <= 50% Then
        (User must move mouse to the left)
        While XPos-OldXPos <0
        While %ResourceUnallocated >=0
            Calculate tentative relative proportion of partition consumed based on current Xpos
```

FROM FIG. 12B

```
            Wend
        Wend
    Else (Partition.Consumed/Partition.Size >50%) Then
        (User must move mouse to the right)
        While Xpos-OldXpos >0
            While %ResourceUnallocated >=0
                Calculate tentative relative proportion of partition consumed based on current Xpos
            Wend
        Wend
    End If
    Tentative Partition.Size = Partition.Consumed/(Tentative proportion of partition consumed)
    Determine increase in YPos of cylinder height based on tentative Partition.Size
    Tentative ResourceUnallocated = ResourceUnallocated - (tentative Partition.Size - Partition.Size)
    For all cylinders whose index is greater than this cylinder,
        Move up by the increase in YPos
        redraw this cylinder
        redraw the tentative pie segment
        Redraw FreeSpace Cylinder based on Tentative ResourceUnallocated Size
End Cylinder.PieSegment_MouseUp()
    (tentative changes become fixed)
    Make the pie segment line solid
    partition size = tentative partition size
    update system with partition size
End
```

METHOD AND APPARATUS FOR DISPLAYING AND CONTROLLING ALLOCATION OF RESOURCE IN A DATA PROCESSING SYSTEM

BACKGROUND OF THE INVENTION

1. Technical Field

The present invention relates generally to an improved data processing system and in particular to a method and apparatus for displaying a graphical user interface. Still more particularly, the present invention relates to a method and apparatus for displaying controls in a graphical user interface to display and control resource allocation by a data processing system.

2. Description of Related Art

The manipulation of data in a data processing system is well known in the prior art. Data may be manipulated in many ways in a modern state-of-the-art data processing system including: data accessing, data encoding, data communications, data compression, data conversion, data entry, data exchange, data filing, data linking, data locking, data manipulation, data mapping, data modeling, data processing, data recording, data sorting, and data transferring. The large amounts of data that are available to the user of a modern state-of-the-art data processing system often become overwhelming in magnitude and complexity. These situations may often arise in the creation or execution of multimedia presentations.

Data processing systems are capable of communicating information to users in many formats, including text, graphics, sounds, animated graphics, synthesized speech, and video. Multimedia presentations employ a data processing system to combine such information formats into a coherent and comprehensive presentation to the user.

As a result of the increasing complexity of data processing systems and with the introduction of multimedia presentations, attempts have been made to simplify the interface between a user and the large amounts of data present within a modern data processing system. One example of an attempt to simplify the interface between a user and a data processing system is the utilization of a so-called graphical user interface (GUI) to provide an intuitive and graphical interface between the user and the data processing system. A GUI is an interface system, including devices, by which a user interacts with a system, system components, and/or system applications via windows or view ports, icons, menus, pointing devices, etc.

The term "mouse", when utilized in this document, refers to any type of operating system supported graphical pointing device including, but not limited to, a mouse, track ball, light pen, touch screen, and the like. A pointing device is typically employed by a user of a data processing system to interact with the data processing system's GUI. A "pointer" is an iconic image controlled by a mouse or other such devices, and is displayed on the video display device of a data processing system to visually indicate to the user icons, menus, or the like that may be selected or manipulated.

One use of GUIs is in the display of resources consumed within a data processing system. Presently available interfaces will display information to the user about available resources and resources that are being used. The presently available interfaces, however, are cumbersome and often times will use large amounts of the display in the data processing system. Further, if a user wishes to adjust the allocation of resources, the user often will have to use a different interface or a different control. Often times, these controls will require a user to enter a quantitative input in the form of a number to change an allocation of resources.

Therefore, it would be advantageous to have an improved method and apparatus for monitoring and controlling the allocation of resources.

SUMMARY OF THE INVENTION

The present invention provides a method and apparatus in a data processing system for displaying resource allocation information. Allocations of a resource are identified. A plurality of geometric shapes, such as cylinders, is displayed, wherein each geometric shape within the plurality of geometric shape provides a graphical representation of an allocation of the resource relative to other geometric shapes within the plurality of geometric shapes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation depicting a data processing system in which the present invention may be implemented in accordance with a preferred embodiment of the present invention;

FIG. 2 is a block diagram illustrating a data processing system in which the present invention may be implemented;

FIGS. 10A and 10B is a diagram illustrating pseudo code for displaying resources and partition depicted in accordance with a preferred embodiment of the present invention;

FIG. 11 is a diagram illustrating pseudo code for manipulating or changing allocation of resources depicted in accordance with a preferred embodiment of the present invention; and FIGS. 12A and 12B is a diagram of pseudo code for managing allocation of resources depicted in accordance with a preferred embodiment of the present invention.

DETAILED DESCRIPTION OF THE PREFERRED EMBODIMENT

Figure 4A:
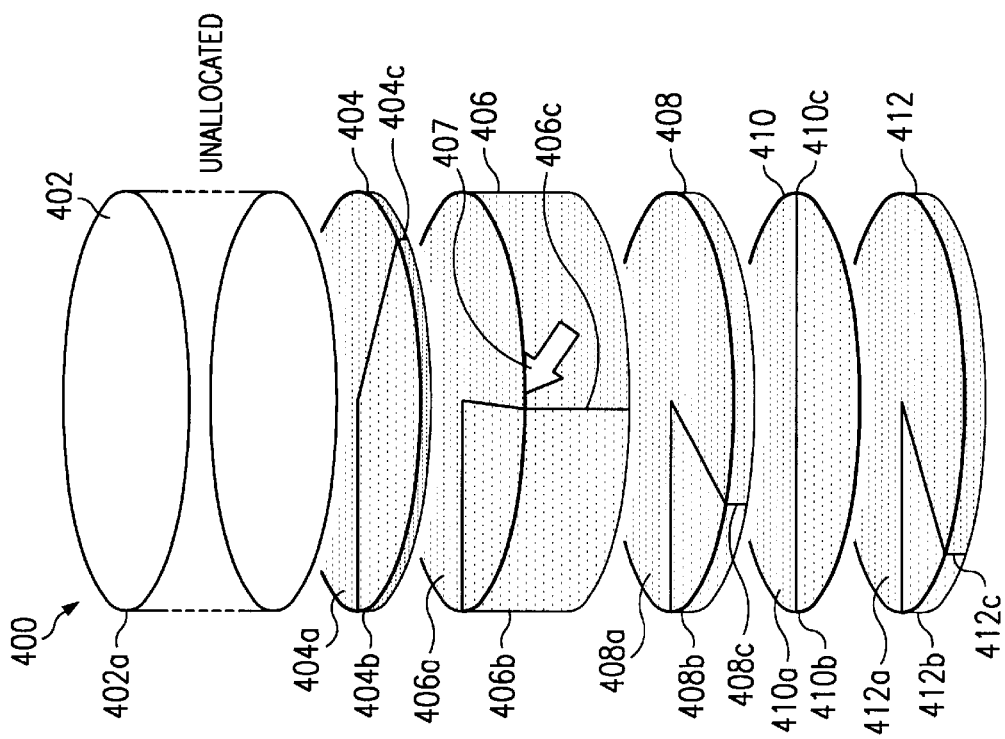
FIGS. 4A–4C are diagrams illustrating the use of a GUI as a control depicted in accordance with a preferred embodiment of the present invention.

With reference now to the figures and in particular with reference to FIG. 1, a pictorial representation depicts a data processing system in which the present invention may be implemented in accordance with a preferred embodiment of the present invention. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International Business Machines Corporation, located in Armonk, N.Y. Although the depicted representation shows a personal computer, other embodiments of the present invention may be implemented in other types of data processing systems, such as network computers, Web based television set top boxes, Internet appliances, etc. Computer 100 also preferably includes a graphical user interface that may be implemented by means of systems software residing in computer readable media in operation within computer 100.

With reference now to FIG. 2, a block diagram illustrates a data processing system in which the present invention may be implemented. Data processing system 200 is an example of a computer, such as computer 100 in FIG. 1. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations.

The present invention provides a method, apparatus, and instructions for a control and display system in a graphical user interface to monitor and manage the allocation of a resource into various apportionments. For example, the resource may be a storage space in which various logical volumes or file systems have been created. The present invention provides a mechanism to display the total sum of the resource in the system, the amount of resource in each of a number of apportionments, the amount of resource that is not currently allocated to any apportionment, and the relative amount of each apportionment that is used and unused. The mechanism provides an interface in which a single intuitive control can be simultaneously used for displaying status information about the resource and for modifying allocations and apportionments in the resource.

In particular, in the depicted examples, the display is for a resource in the form of a file system storage space on a UNIX based data processing system. A UNIX file system contains a subset of storage space available in a physical or logical storage volume. Users and applications consume or use storage space in the file system. When the file system space is consumed and if additional space is still available in the logical or physical volume, an administrator may expand the file system with previously unallocated space in the storage volume. In current UNIX file systems, the administrator typically must first obtain the report of the file systems in the computer to identify any that are coming close to consuming their full capacity. Then, the administrator must determine the total amount of the resource available in a physical or logical volume. Finally, if sufficient storage space that is not yet allocated is present, the administrator may increase the allocation to any file systems that need extra resources.

A mechanism is present for viewing total storage capacity, unallocated storage, relative allocations in each file system, and the amount used in each file system in a single integrated display and control mechanism. By use of a direct manipulation graphical user interface, an administrator may use the present invention to resolve problems from the same interface that is used to report the status of the storage system. As a result, the GUI allows an administrator to reduce three steps into a single intuitive operation, greatly improving the ease of the task and reducing errors.

Figure 3:
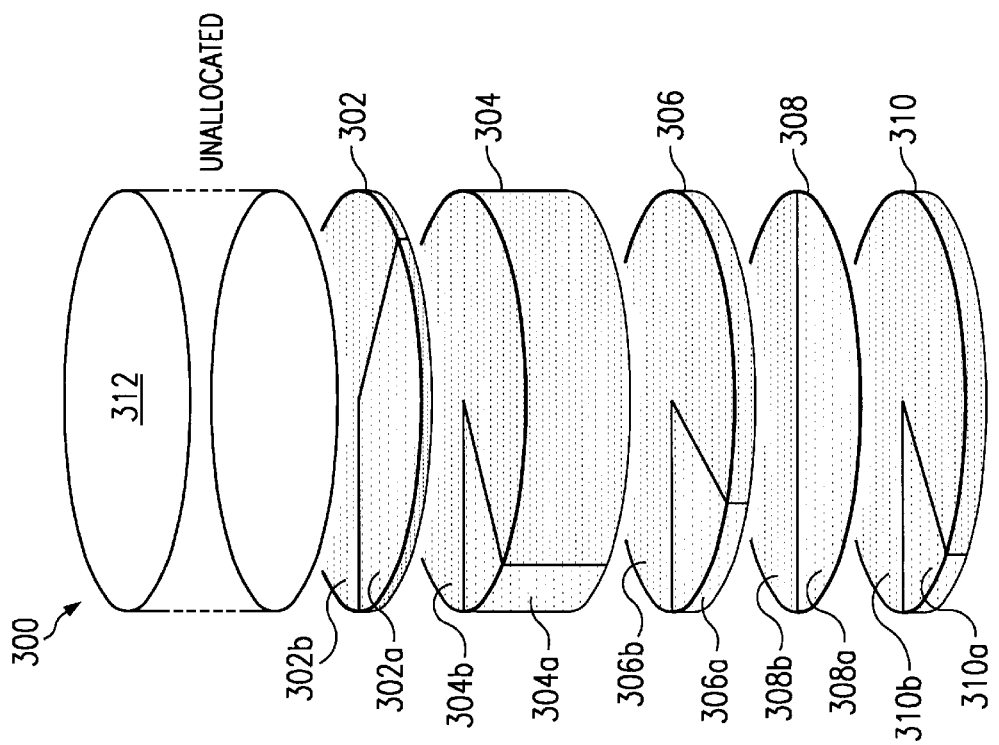
FIG. 3 is a graphical user interface (GUI) for indicating the status of a resource and for managing the resource depicted in accordance with a preferred embodiment of the present invention.

With reference now to FIG. 3, a graphical user interface for indicating the status of a resource and for managing the resource is depicted in accordance with a preferred embodiment of the present invention. In the depicted examples, the resource is that of storage space in which various apportionments, such as file systems for logical volumes are displayed within the graphical user interface (GUI) and provide a control for managing these apportionments.

In the depicted example, GUI 300, is a display of a stack of cylinders, including cylinders 302–312. Each cylinder in GUI 300, represents an apportionment of that resource with the height or volume of the cylinder representing the amount of the resource. Sections 302a–310a indicate the used or consumed portions of each cylinder while sections 302b–310b illustrate the unused or unconsumed portions of the apportionment. Cylinder 312 indicates the unallocated portions of the resource. As a result, the division of the cylinders represents the amount of resources currently consumed and unconsumed. The top most cylinder, cylinder 312, is shown as an open or transparent cylinder, which represents the unallocated portion of the resources.

Color coding may be used to represent the consumed and unconsumed resource as well as exception conditions when the amount of the consumed resource falls above a threshold. For example, the unconsumed resources may be illustrated in green while the consumed resources are illustrated in yellow. The color red may be used to indicate when an exception condition, such as when the amount of consumed resources falls above a threshold that is set. For example, in this example sections 302b and 306b–310b would be illustrated in green to indicate the unconsumed or unused portion of each cylinder while sections 302a–310a may be illustrated in yellow to indicate the amount of consumed or used resource. In this example, cylinder 304 would have section 304b indicated in red to indicate that the amount of unconsumed resource has fallen below some selected threshold. In this example, cylinder 308 would have section 308a indicated in red to indicat that the amount of uncomsumed resource has fallen above some selected threshold. Of course other colors and types of indications may be used. For example, various patterns may be placed within the cylinders such as dots or crosses or diamonds when certain conditions are present.

In addition to providing a status display for indicating the relative amount of resource apportionments, the amounts consumed and unconsumed in each apportionment, and the amount of unallocated resource, GUI 300 may be used as a control to receive input for making changes in the allocation of resources.

Figure 4C:
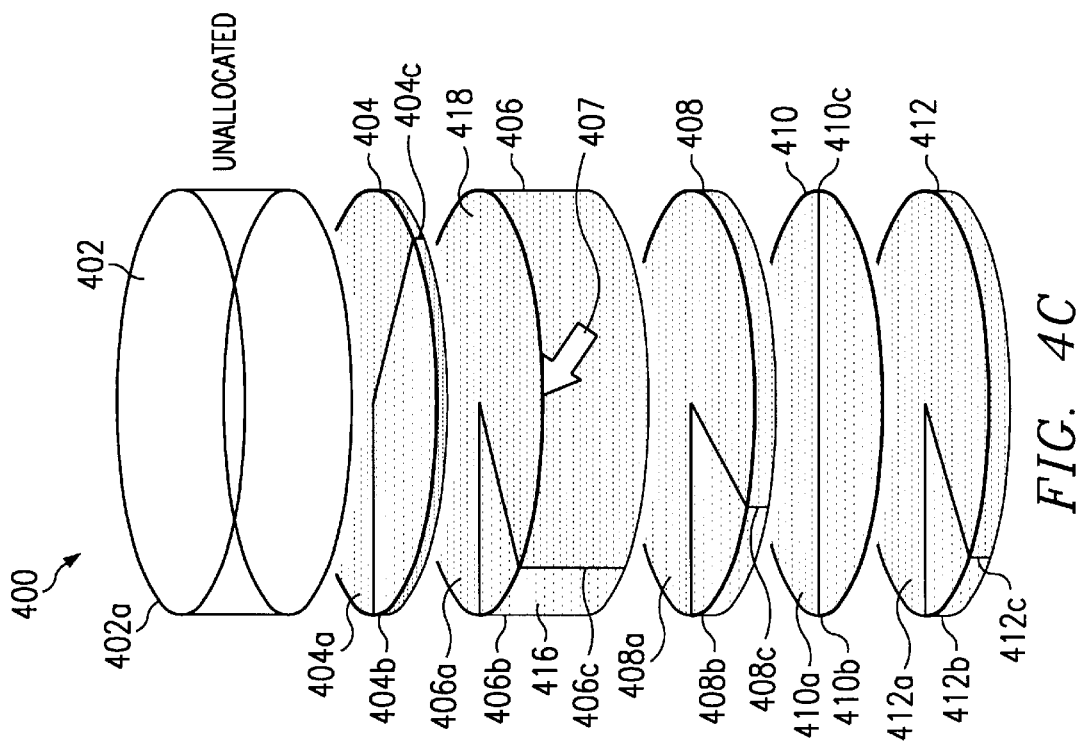
Figure 4B:
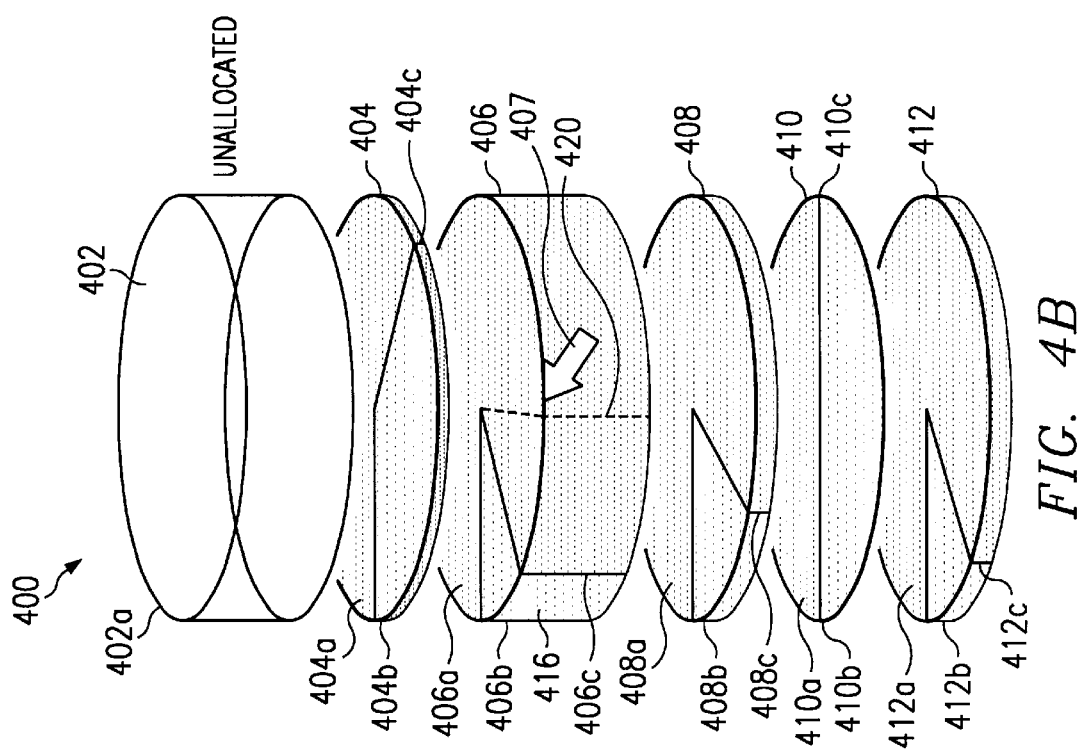

With reference now to FIGS. 4A–4C, diagrams illustrating the use of a GUI as a control is depicted in accordance with a preferred embodiment of the present invention. GUI 400 in this depicted example also may be used as a control in addition to providing status information as to apportionments and usage of a resource. For example, regions defined as "hot spots" may be implemented to provide for user interaction. Such hot spots may be provided within each cylinder. A hot spot is a region that marks the exact location that will be effected by a mouse action, such as a button press.

In the depicted examples, cylinders 404–412 include hot spots 404a–412a, which in each cylinder is the line representing the top face of the cylinder. Further, hot spots 404b–412b and 404c–412c are the vertical lines defining a pie section in each cylinder. The user through pointer 414 may select one of these hot spots by depressing a control on a pointing device, such as a mouse button and drag the hot spots to change the allocation of an apportionment in a particular cylinder. Dragging occurs when the hot spot has been selected and the pointer is moved by the user. In the depicted example, pointer 407 is used to select hot spot 406a and in FIG. 4B, hot spot 406a has been dragged "up" in GUI 400.

As a result, the allocation of the apportionment has been changed correctly by increasing the amount of space in the apportionment in cylinder 406. As can be seen, section 416 decreases while section 418 increases in cylinder 406 to indicate the relative amounts of consumed and unconsumed apportionment within cylinder 406 as a result of the change in the apportionment. As the apportionment is increased, the total volume of cylinder 406 increases. As a result, the relative amount of unconsumed resource within cylinder 406 increases as can be seen in section 418 while the amount of consumed resource decreases as indicated in section 416. Finally, the amount of total unallocated resource as indicated by cylinder 402 is decreased as the act of increasing the volume of any one of cylinders 404–412. The change in the apportionment takes place when the user released the mouse button as shown in FIG. 4C. In FIG. 4B, dotted line 420 indicates the original amount of consumed resource versus unconsumed resource.

When the user releases the mouse button or finishes the change in cylinder 406, dotted line 420 disappears with the change in the allocation of resources being finalized or put in place. Further, a change in color may indicate that the resource has been increased to an amount in which unconsumed resources are above a threshold. For example, section 406a may be in red in FIG. 4A and change to green in FIG. 4B when the allocation has changed.

Figure 5B:
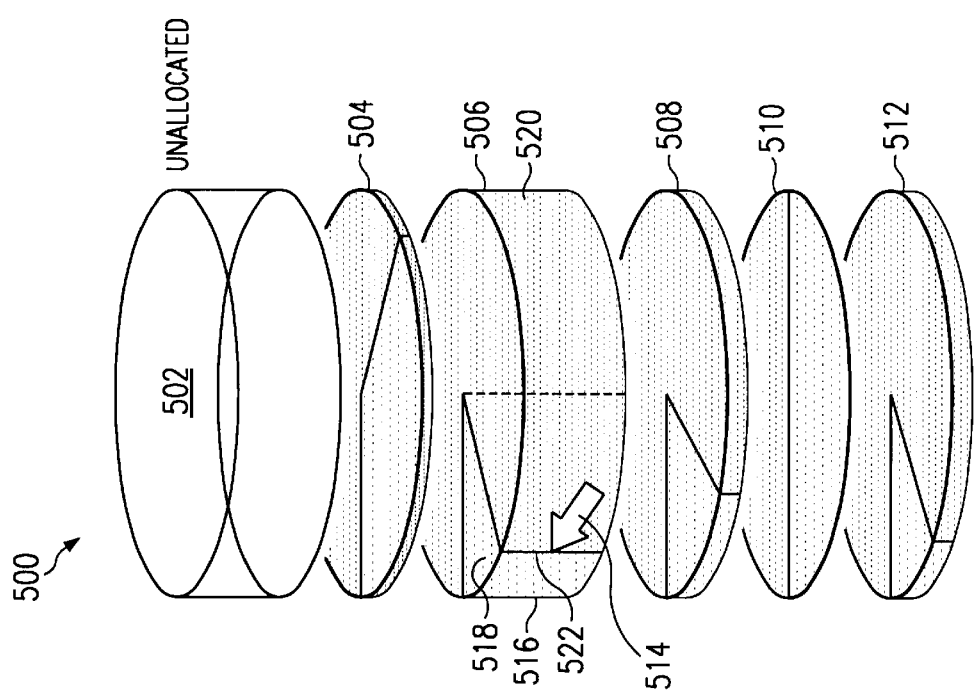
FIGS. 5A–5C are diagrams illustrating the management of resources using a GUI depicted in accordance with a preferred embodiment of the present invention.
Figure 5A:
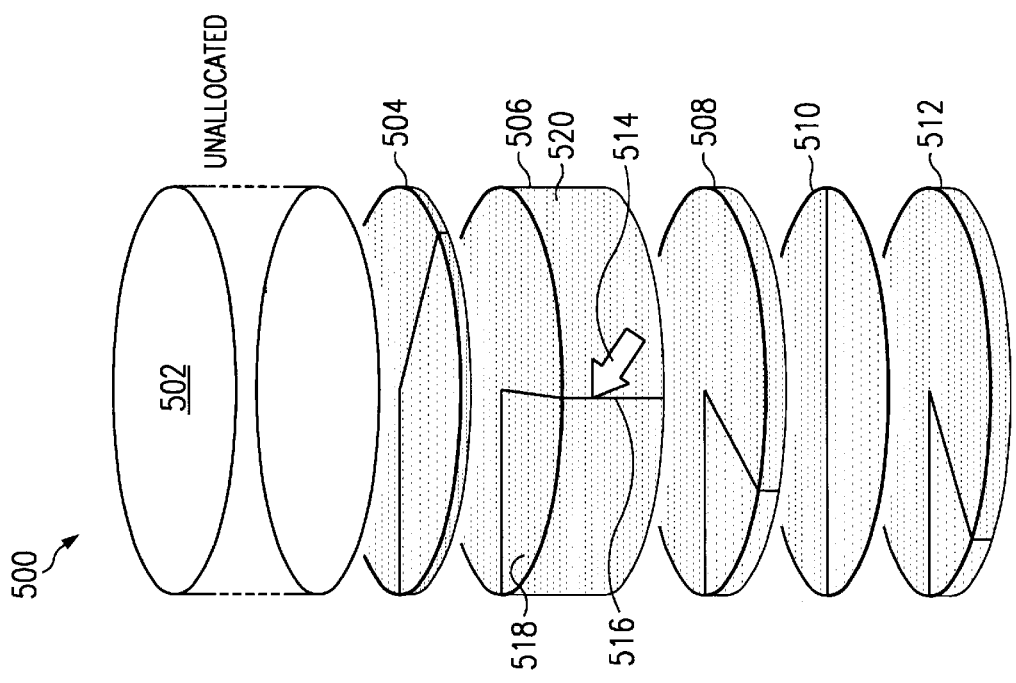
Figure 5C:
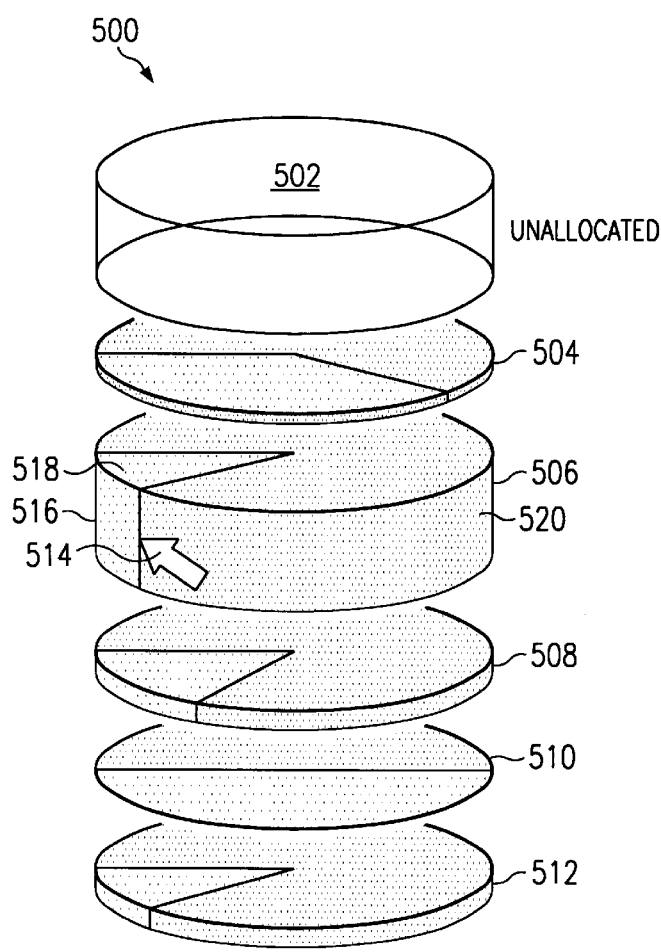

In FIGS. 5A–5C, diagrams illustrating the management of resources using a graphical interface is depicted in accordance with a preferred embodiment of the resent invention. In this example, GUI 500 contains cylinders 502–512, in which cylinder 502 indicates the total amount of unallocated resource. In this example, pointer 514 is used to select hot spot 516 and cylinder 506, which in this example is the vertical line. Section 518 in cylinder 506 indicates the amount of unconsumed resource in 506 while section 520 indicates the amount of consumed resource in cylinder 506.

In FIG. 5A, the user selects hot spot 516 and drags the hot spot to the left in this illustration as can be seen in FIG. 5B. Dotted line 522 indicates the original amount of unconsumed resource verses the consumed amount prior to the user dragging hot spot 516 to the left. By dragging hot spot 516 to increase the amount of unconsumed resource, the total volume of cylinder 506 is increased as can be seen by the thickening of cylinder 506. Further, cylinder 502 is decreased in volume as can be seen in FIG. 5B. Section 518 increases in size while section 520 decreases in size illustrating the relative amount of unconsumed resource to the relative consumed resource in cylinder 506. Section 518 illustrates the amount of unconsumed resource while section 520 illustrates the amount of consumed resource in this example. When the user releases the mouse button in FIG. 5C, dotted line 522 disappears and the change in allocation becomes effective. Similarly, as in the other figures section 520 and cylinder 506 may change from red in FIG. 5A to green in FIG. 5B when sufficient resources have been allocated to cylinder 506 to have those resources reach an amount above some selected threshold value.

The control of the present invention is able to handle a number of different cases. For example, as the number of apportionments increase, the height of the apportionment decreases relative to all of the other cylinders. An apportionment cylinder may have height as thin as a single pixel. Alternatively, the stack of the cylinder can be made scrollable with a scroll bar used to manipulate the display of the cylinders if the number of sections become too large to display within a single view.

Further, each apportionment also may be combined with text labels to identify each cylinder along with numeric text inputs/display fields for indicating the amount of resource in a numerical manner. For example, the total megabytes used, and megabytes available may be displayed in association with the cylinders. Each cylinder may be labeled with logical volume identifier, such as g: or f:. Further, these numerical identifications may be displayed when the pointer is placed over the cylinder while other cylinders do not display such information to avoid cluttering the display and usefulness of GUI to the user.

Figure 6A:
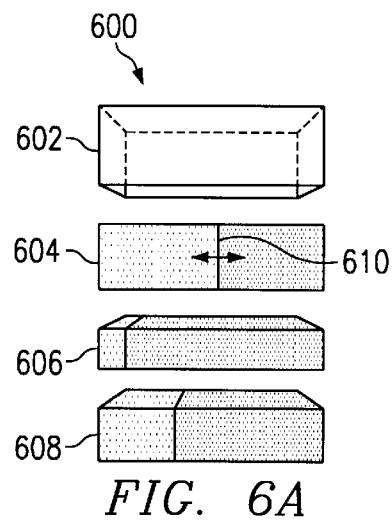
FIGS. 6A and 6B are illustrations of a GUI for managing resources in accordance with a preferred embodiment of the present invention.
Figure 6B:
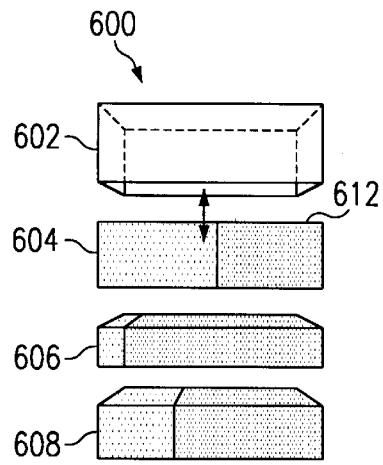

An alternative form, is for example, without limitation, a series of stacked boxes, square in cross-section, rather than cylinders. The boxes could be subdivided vertically to show the consumed/unconsumed portions of each. However, there is really no need for the representation to appear as if it were three dimensional. Two dimensional rectangles would work just as well, with the area of the rectangle representing the total resource. Also note that the division of each cylinder into only two areas (consumed, unconsumed) in the example could be generalized into a greater number of subdivisions. For example, using the logical disk storage example, the divisions might be "consumed", "unconsumed", and "reserved". Of course, other types of geometric shapes in a stacked form may be used. Mixes of the shapes, such as cylinders and boxes also may be employed. For example, in FIGS. 6A and 6B, illustrations of a control for managing resources is depicted in accordance with a preferred embodiment of the present invention. GUI 600 is a control that includes boxes 602–608 in which the boxes are used to indicate resource allocation in a fashion similar to that using cylinders. Box 602 shows unallocated resources, while boxes 604–608 show allocated resources and indication of the consumed and unconsumed portions of the allocated resources. Hot spots for adjusting the allocations also may be provided for the boxes. For example, in FIG. 6A, hot spot 610 is a vertical line dividing consumed and unconsumed portions of box 604 while in FIG. 6B, hot spot 612 is a horizontal line at the top of box 604.

Figure 7:
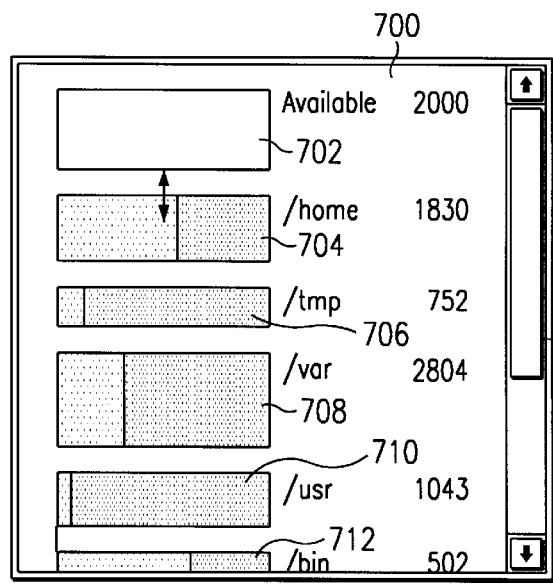
FIG. 7 is a diagram of a GUI in accordance with a preferred embodiment of the present invention.

Next, FIG. 7 is a diagram of a GUI in accordance with a preferred embodiment of the present invention. GUI 700 includes rectangles 702–712. Additional resource allocations are present but are shown in FIG. 7. These undisplayed resource allocations can be viewed using scroll bar 714. Further GUI 700 also includes annotations, such as "Available", "2000", "/home", and "1830" to identify the apportionment of the resource and the amount of resource actually allocated to the apportionment.

Thus, the present invention provides a mechanism in which a control is able to display an apportion resources, unallocated resources, available resources within apportionment, and currently consumed resources in apportionments in a single graphical control. Further, this control may also be used to manipulate or change the apportionments and the allocations of resources.

With reference now to FIG. 8, a flowchart of a process to create a resource display is depicted in accordance with a preferred embodiment of the present invention. The process begins by initializing variables in which the variable TotalResourceAllocated and the Partitions are set equal to zero (step 800). Next, the total NumberOfPartitions and Total-ResourceSize are read and stored into variables respectively (step 802). The variable NumberofPartitions may represent, for example, the number of logical volumes or file systems. The VariableTotalResourceAllocated may be the total amount of space available on a storage system. A determination is then made as to whether the variable Partition is less than or equal to the variable NumberOfPartitions read in step 802 (step 804). If the variable Partition is less than the number of partitions, the Partition is then incremented by one (step 806). This incrementation is used to obtain the next partition for processing. Thereafter, the partition size and the amount of the partition consumed is obtained (step 808). This information is stored into variables PartitionSize and AmountConsumed. A variable TotalResourceAllocated is set equal to TotalResourceAllocated plus PartitionSize (step 810). The variable TotalResourceAllocated represents all the allocated resources. Thereafter, the variable UnallocatedResource is set equal to the TotalResouce minus the TotalResourceAllocated (step 812). The variable UnallocatedResource is the amount of the resource that remains unallocated. Thereafter, the thickness or height of the cylinder is set as follows: VerticalPixelsForCylinders= VerticalPixelsAvailable−(TopMargin +BottomMargin)− EllipseDepth−(NumberofPartitions*PartitionSpacing) (step 814).

The variable VerticalPixelsForCylinders represents the amount of pixels that are available for displaying a cylinder. The variable VerticalPixelsAvailable represents the amount of pixels that can be used to display the control. Top Margin is the space between the top of the uppermost cylinder and the top edge of the window used to present the display/control. Bottom Margin is the space between the bottom of the bottom-most cylinder and the bottom edge of the window used to display the display/control. Ellipse Depth is the vertical space that is used to represent the top face of each cylinder, viewed obliquely as an ellipse. Partition Spacing is the vertical distance between the top of one cylinder and the bottom of the cylinder immediately above it.

Thereafter, the VerticalPixelsForUnallocted are set equal to VerticalPixelsForCylinders (step 816). The variable VerticalPixelsForUnAllocated are set equal to the amount of pixels left after an allocation has been made to display cylinders. The partition is then set equal to zero (step 818). The YStartPosition is set equal to the BottomMargin (step 820). Thereafter, a determination is made as to whether the variable partition is less than or equal to the NumberOfPartitions (step 822). If the variable Partition is less than or equal to the NumberOfPartitions, then the variable Partition is incremented by one (step 824). Thereafter, a PartitionObject is constructed (step 826). This PartitionObject is constructed using the PartitionSize, AmountConsumed, the percentage consumed. The percent consumed is defined by the AmountConsumed divided by the PartitionSize. Thereafter, the PartitionObject is drawn (step 828). This involves using the PartitionObject constructed along with a YStartPosition. In addition, the height of the cylinder is defined as follows: HtOfCylinder=(PartitionSize/TotalResource) *VerticalPixelsFor Cylinders. In addition, the EllipseDepth is used as well as setting a PieSection to draw the partition object. The PieSection is set equal to the percent consumed. Thereafter, the VerticalPixelsForUnallocated are set equal to VerticalPixelsForUnallocted minus the height of the cylinders (step 830). Thereafter, the YStartPosition is set equal to the current value of the YStartPosition plus the height of the cylinder plus partition spacing (step 832) with the process then returning to (step 822).

With reference again step 822, if the variable partition is not less than or equal to the NumberOfPartitions the unallocated cylinder is then drawn (step 834) with the process then terminating.

With reference again to step 804 if the variable partition is not less than or equal to the NumberOfPartitions, the process then proceeds to step 812 as described above.

With reference now to FIG. 9, a flow chart of the process for managing a partition is depicted in accordance with a preferred embodiment of the present invention. The process begins by obtaining the variable YPosition and setting the variable YStart equal to YPosition (step 900). The YStart is the starting place for displaying the cylinders. Thereafter, a determination is made as to whether the variable UnallocatedResource is greater than zero (step 902). If the variable UnallocatedResource is not greater than zero, the process returns to step 902. Otherwise, a determination is made as to whether a pointer is over the top face of a cylinder that represents a partition (step 904). If the pointer is not over the top face of a cylinder that represents a partition, the process then sets the top face highlight equal to Off (step 906) with the process then returning to step 902.

Otherwise, the top face highlight is set equal to On (step 908) with a determination then made as to whether the mouse select button has been depressed (step 910). If the mouse select button has not been depressed, the process returns to (step 902). Otherwise, the variable of ThisPartitionObject is set equal to GetPartitionIndex (step 912). The variable GetPartitionIndex is used as an index to identify the partition that is to be processed. A determination is then made as to whether the mouse has been moved (step 914). If the mouse has not been moved, the process returns to step 914. Otherwise, the process obtains the YPosition (step 916). A determination is then made as to whether the current YPosition is greater than YStart (step 918).

If the current position is not greater than YStart, the process then returns to step 914. If the current YPosition is greater than YStart, then the variable YChange is set equal to the variable YPosition minus YStart (step 920). Thereafter, an unallocated cylinder is then drawn (step 922) this involves setting YStart position equal to YStart position plus YChange. Additionally, the height of the cylinder is set equal to the height of the cylinder minus YChange. Also, the EllipseDepth is also been set.

Thereafter, the PartitionIndex is set equal to the NumberOfPartitions (step 924). A determination is then made as to whether the PartitionIndex is greater than ThisPartitionObject (step 926). If the PartitionIndex is greater than ThisPartitionObject then the cylinder is moved for the PartitionObject [PartitionIndex] by YChangePixels (step 928). Then, the variable PartitionIndex is set equal to PartionIndex minus one (step 930). With the process then returning to step 926. This loop continues until the variable PartitionIndex is no long greater than ThisPartitionObject. At that point in time, for the PartitionObject [ThisPartitionObject], a new PartitionSize is set equal to the PartitionSize plus the YChange divided by VerticalPixelsForCylinders. A new percent consumed is then set equal to the amount consumed divided by the NewPartitionSize (step 932). Thereafter, the PartitionObject is then drawn (step 934). A determination is then made as to whether a mouse release event has been received (step 936). If a mouse release button has not been received, the process then returns to step 902. Otherwise, then for the PartitionObject [ThisPartitionObject], the PartitionSize is set equal to new PartitionSize and the percent consumed is set equal to the amount consumed divided by the NewPartitionSize (step 938) with the process terminating thereafter.

With reference now to FIG. 10, a diagram illustrating pseudo code for displaying resources and partition is depicted in accordance with a preferred embodiment of the present invention. Section 1000 illustrates the identification of various variables used in the pseudo code for displaying resources and partitions. Section 1002 illustrates code for actually processing the various partitions and displaying the resources in the form of cylinders.

With reference now to FIG. 11, a diagram illustrating pseudo code for manipulating or changing allocation of resources is depicted in accordance with a preferred embodiment of the present invention. Section 1100 indicates the highlighting of various phases depending on the position of the pointer. Section 1102 illustrates the instructions used to change the display of the partition size based on an increase or decrease of the allocation of resources in a cylinder. The code in section 1102 is that used to actually change the size of the partition as illustrated in FIGS. 4A–4C.

With reference now to FIG. 12, a diagram of pseudo code for managing allocation of resources is depicted in accordance with a preferred embodiment of the present invention. Section 1200 illustrates code used to highlight portions of the cylinder depending on the location of the pointer. Section 1202 illustrates the instructions used to increase or decrease an allocation of resources to a cylinder in response to a change in the unconsumed or unallocated portion of a cylinder. The instructions in this section correspond to the illustrations in section FIGS. 5A–5C. The pseudo code illustrated in the figures use notation borrowed from Visual Basic.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. Although the depicted examples deals with a data processing resource, the present invention can be applied to other types of resources. The resource could be any type of resource that is partitioned into pools each of which is further subdivided. Another example might be software for managing an employee's 401K plan—where the total resource is the total amount of funds that can be contributed each pay period for an employee. The total of the cylinders is the total contribution each month, each cylinder represents a different investment fund allocation in the 401K plan. Cylinders are then subdivided into the employee contribution to each fund, and a matching contribution from the employer. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for displaying resource allocation information, the method comprising the data processing system implemented steps of:

identifying allocations of a resource; and displaying a plurality of geometric shapes, wherein each geometric shape within the plurality of geometric shapes provides a graphical representation of an allocation of the resource relative to other geometric shapes within the plurality of geometric shapes, wherein each geometric shape includes an indication of an unconsumed portion of the allocation and an indication of a consumed portion of the allocation.

2. The method of claim 1, wherein the resource is a storage device.

3. The method of claim 2, wherein the storage device is a hard disk drive.

4. The method of claim 2, wherein the storage device is a memory.

5. The method of claim 1, wherein each of the plurality of geometric shapes represents a logical volume created on a storage device.

6. The method of claim 1, wherein the one geometric shape within the plurality of geometric shapes represents unallocated portions of the resource.

7. The method of claim 1 further comprising:
displaying an identification for each of the plurality of geometric shapes.

8. The method of claim 1, wherein the indication of the unconsumed portion is a first color while the indication of the consumed portion is a second color.

9. The method of claim 1 further comprising:
providing an input means in the plurality of geometric shapes for receiving user input;
responsive to receiving user input directed towards a selected geometric shape within the plurality of geometric shapes, changing the allocation of the resource represented by the geometric shape, wherein a changed allocation of the resource occurs for the selected geometric shape; and
redisplaying the plurality of geometric shapes to account for changed allocation.

10. The method of claim 9, wherein the input means is plurality of hot spots.

11. The method of claim 1 further comprising:
displaying an indicator when the allocation for a geometric shape is less than a threshold value.

12. The method of claim 11, wherein the plurality of geometric shapes are displayed in a first color and wherein the indicator is a display of the geometric shape in a second color.

13. The method of claim 1, wherein the plurality of geometric shapes is a plurality of cylinders.

14. The method of claim 1, wherein the plurality of geometric shapes is a plurality of boxes.

15. The method of claim 1, wherein the plurality of geometric shapes is a plurality of rectangles.

16. The method of claim 1, wherein the plurality of geometric shapes is a plurality of cylinders and boxes.

17. A method in a data processing system for displaying resource allocation information, the method comprising the data processing system implemented steps of:
displaying a plurality of cylinders in an array, wherein each cylinder within the plurality of cylinders provides a graphical representation of an allocation of the resource relative to other cylinders within the plurality of cylinders;
providing a plurality of hot spots of the plurality of cylinders, wherein each hot spot is used to receive input to adjust the allocation of the resource for the cylinder associated with the hot spot; and
responsive to receiving user input to adjust the allocation, adjusting the allocation of the resource for the cylinder associated with the hot spot, wherein each cylinder includes an indication of an unconsumed portion of the allocation and an indication of a consumed portion of the allocation.

18. The method of claim 17, wherein the resource is a storage device.

19. The method of claim 18, wherein the storage device is a hard disk drive.

20. The method of claim 17, wherein one cylinder within the plurality of cylinders represents unallocated portions of the resource.

21. The method of claim 17 further comprising:
displaying an identification for each of the plurality of cylinders.

22. A graphical control for use in a data processing system to manage an allocation of a resource, the graphical control comprising:
identification means for identifying the allocation of the resource;
a plurality of cylinders displayed in a stack within the data processing system, wherein each of the plurality of cylinders represents an allocation of the resource relative to other cylinders within the plurality of cylinders and wherein each cylinder includes an indication of an unused portion and a used portion of the allocation; and
a plurality of hot spots, wherein the plurality of hot spots is used to receive input to change the allocation of the resource.

23. The graphical control of claim 22, wherein the plurality of cylinders represents a plurality of logical volumes on a hard disk drive.

24. A data processing system for displaying resource allocation information, the data processing system comprising:
identifying means for identifying allocations of a resource; and
displaying means for displaying a plurality of geometric shapes, wherein each geometric shape within the plurality of geometric shapes provides a graphical representation of an allocation of the resource relative to other geometric shapes within the plurality of geometric shapes, wherein each geometric shape includes an indication of an unconsumed portion of the allocation and an indication of the consumed portion of the allocation.

25. The data processing system of claim 24, wherein the resource is a storage device.

26. The data processing system of claim 25, wherein the storage device is a hard disk drive.

27. The data processing system of claim 25, wherein the storage device is a memory.

28. The data processing system of claim 24, wherein each of the plurality of geometric shapes represents a logical volume created on a storage device.

29. The data processing system of claim 24, wherein one geometric shape within the plurality of geometric shapes represents unallocated portions of the resource.

30. The data processing system of claim 24 further comprising:
displaying means for displaying an identification for each of the plurality of geometric shapes.

31. The data processing system of claim 24, wherein the indication of the unconsumed portion is a first color while the indication of the consumed portion is a second color.

32. The data processing system of claim 24 further comprising:

providing means for providing an input means in the plurality of geometric shapes for receiving user input;

changing means, responsive to receiving user input directed towards a selected geometric shape within the plurality of geometric shapes, for changing the allocation of the resource represented by the geometric shape, wherein a changed allocation of the resource occurs for the selected geometric shape; and redisplaying means for redisplaying the plurality of geometric shapes to account for changed allocation.

33. The data processing system of claim 32, wherein the input means is plurality of hot spots.

34. The data processing system of claim 33 further comprising:

displaying means for displaying an indicator when the allocation for a geometric shape is less than a threshold value.

35. The data processing system of claim 34, wherein the plurality of geometric shapes are displayed in a first color and wherein the indicator is a display of the geometric shape in a second color.

36. The data processing system of claim 24, wherein the plurality of geometric shapes is a plurality of boxes.

37. The data processing system of claim 24, wherein the plurality of geometric shapes is a plurality of rectangles.

38. The data processing system of claim 24, wherein the plurality of geometric shapes is a plurality of cylinders and boxes.

39. A data processing system for displaying resource allocation information, the data processing system comprising:

displaying means for displaying a plurality of cylinders in an array, wherein each cylinder within the plurality of cylinders provides a graphical representation of an allocation of the resource relative to other cylinders within the plurality of cylinders;

providing means for providing a plurality of hot spots of the plurality of cylinders, wherein each hot spot is used to receive input to adjust the allocation of the resource for the cylinder associated with the hot spot; and adjusting means for responsive to receiving user input to adjust the allocation, adjusting the allocation of the resource for the cylinder associated with the hot spot, wherein each cylinder includes an indication of an unconsumed portion of the allocation and an indication of the consumed portion of the allocation.

40. The data processing system of claim 39, wherein the resource is a storage device.

41. The data processing system of claim 40, wherein the storage device is a hard disk drive.

42. The data processing system of claim 39, wherein one cylinder within the plurality of cylinders represents unallocated portions of the resource.

43. The data processing system of claim 39, further comprising:

displaying means for displaying an identification for each of the plurality of cylinders.

44. A computer program product in a computer readable medium for displaying resource allocation information, the computer program product comprising:

first instructions for identifying allocations of a resource; and second instructions for displaying a plurality of geometric shapes, wherein each geometric shape within the plurality of geometric shapes provides a graphical representation of an allocation of the resource relative to other geometric shapes within the plurality of geometric shapes, wherein each geometric shape includes an indication of an unconsumed portion of the allocation and an indication of the consumed portion of the allocation.

45. A computer program product in a computer readable medium for displaying resource allocation information, the computer program product comprising:

first instructions for displaying a plurality of cylinders in an array, wherein each cylinder within the plurality of cylinders provides a graphical representation of an allocation of the resource relative to other cylinders within the plurality of cylinders;

second instructions for providing a plurality of hot spots of the plurality of cylinders, wherein each hot spot is used to receive input to adjust the allocation of the resource for the cylinder associated with the hot spot; and third instructions, responsive to receiving user input to adjust the allocation, for adjusting the allocation of the resource for the cylinder associated with the hot spot, wherein each cylinder includes an indication of an unconsumed portion of the allocation and an indication of the consumed portion of the allocation.

\* \* \* \* \*

UNITED STATES PATENT AND TRADEMARK OFFICE
CERTIFICATE OF CORRECTION

PATENT NO. : 6,404,444 B1
DATED : June 11, 2002
INVENTOR(S) : Johnston et al.

It is certified that error appears in the above-identified patent and that said Letters Patent is hereby corrected as shown below:

Title page,
Item [54], Title, after "OF", please delete "RESOURCE" and insert
-- RESOURCES --.

Figure 8A:
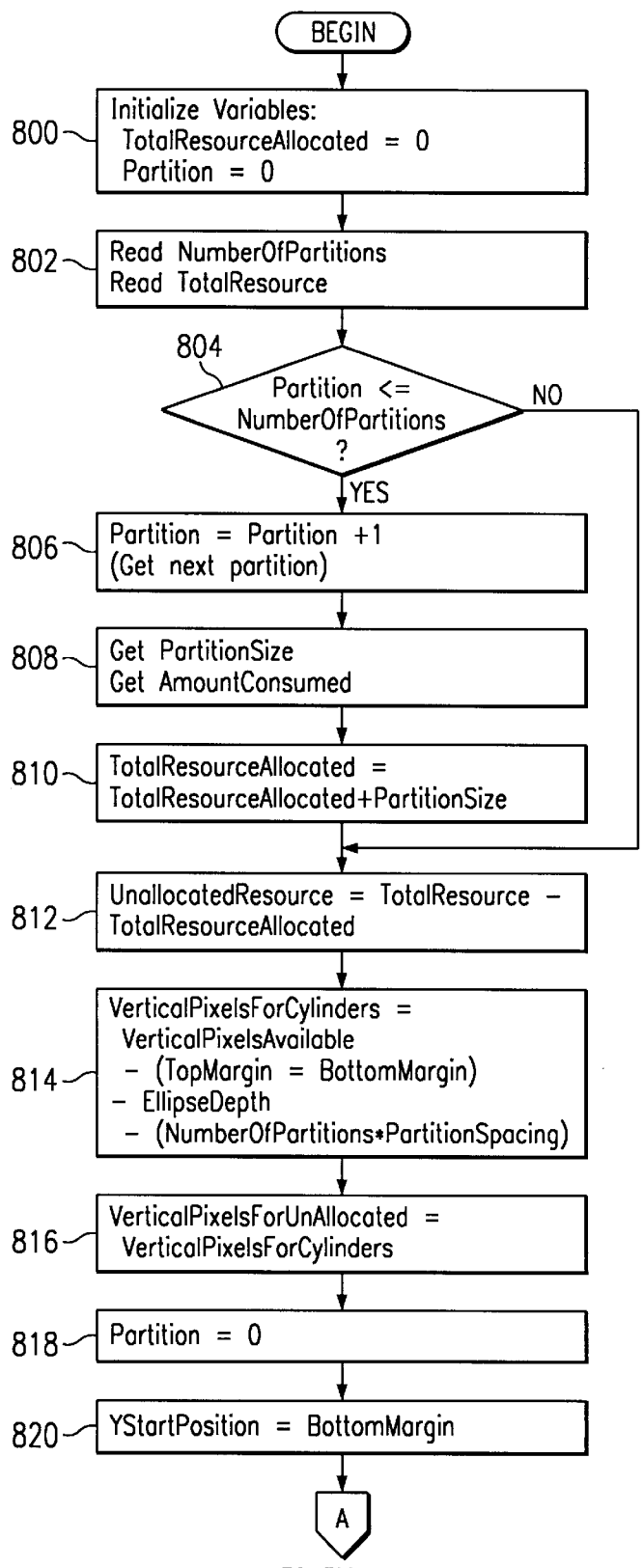
FIGS. 8A and 8B is a flowchart of a process to create a resource display depicted in accordance with a preferred embodiment of the present invention.
Figure 8B:
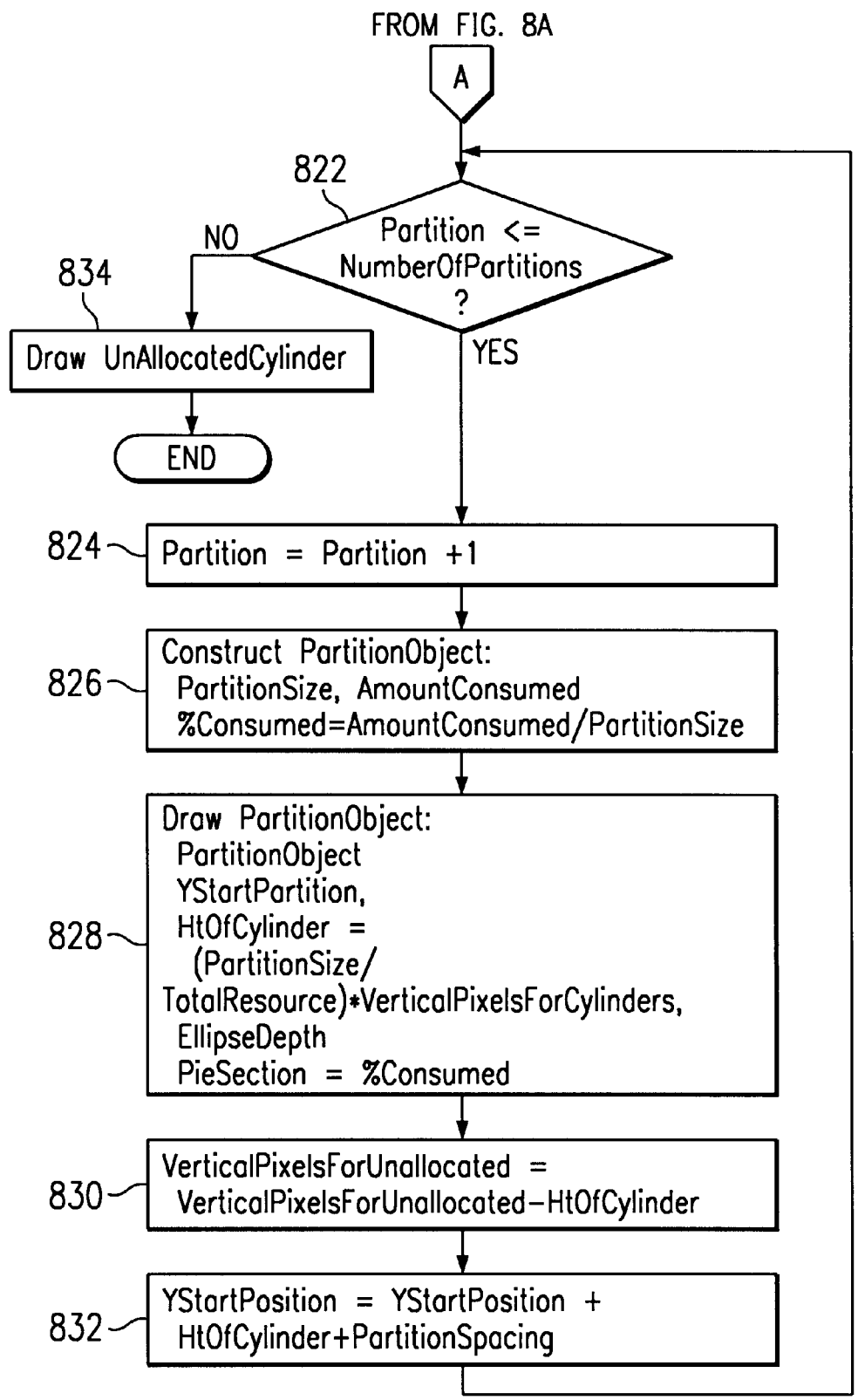

Column 7,
Line 61, after "now to", please delete "FIG. 8" and insert -- FIGS. 8A-8B --.

Column 8,
Lines 39 and 62, after "the", please delete "VerticalPixelsForUnallocted" and insert
-- VerticalPixelsForUnallocated --.

Figure 9A:
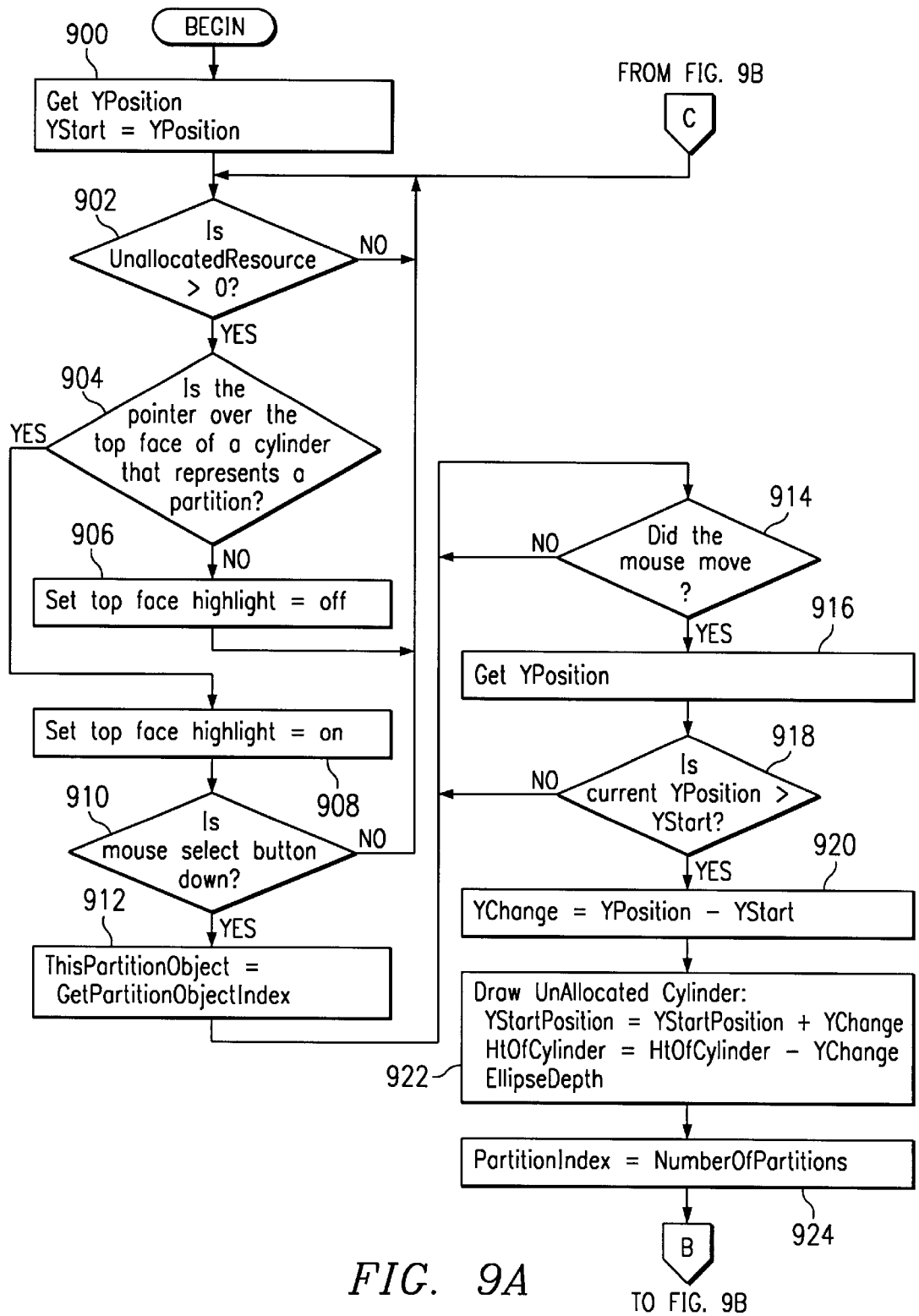
FIGS. 9A and 9B is a flowchart of the process for managing a partition depicted in accordance with a preferred embodiment of the present invention.
Figure 9B:
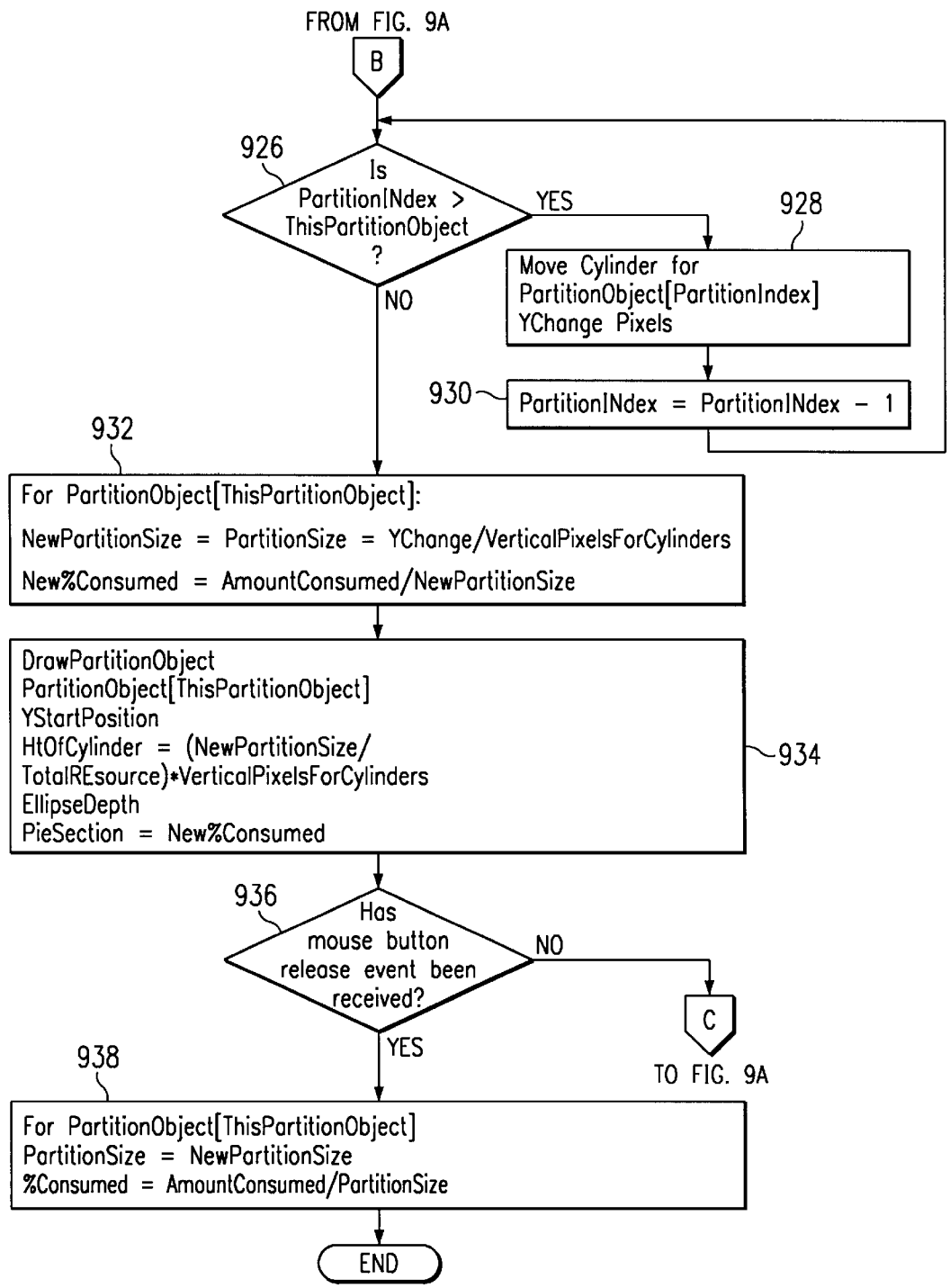

Column 9,
Line 6, after "now to", please delete "FIG. 9" and insert -- FIGS. 9A-9B --.
Line 66, after "now to", please delete "FIG. 10" and insert -- FIGS. 10A-10B --.

Column 10,
Line 17, after "now to", please delete "FIG. 12" and insert -- FIGS. 12A-12B --.

Column 13,
Line 15, after "claim", please delete "33" and insert -- 24 --.

Signed and Sealed this

Twenty-ninth Day of April, 2003

JAMES E. ROGAN
*Director of the United States Patent and Trademark Office*